(12) United States Patent
Strelow et al.

(10) Patent No.: US 7,725,257 B2
(45) Date of Patent: May 25, 2010

(54) METHOD AND SYSTEM FOR NAVIGATION OF AN UMMANNED AERIAL VEHICLE IN AN URBAN ENVIRONMENT

(75) Inventors: Dennis W. Strelow, Sunnyvale, CA (US); Alan B Touchberry, St. Louis Park, MN (US)

(73) Assignee: Honeywell International Inc., Morristown, NJ (US)

( * ) Notice: Subject to any disclaimer, the term of this patent is extended or adjusted under 35 U.S.C. 154(b) by 866 days.

(21) Appl. No.: 11/470,134

(22) Filed: Sep. 5, 2006

(65) Prior Publication Data
US 2008/0059065 A1    Mar. 6, 2008

(51) Int. Cl.
*G01C 21/00*     (2006.01)
(52) U.S. Cl. ...................... 701/213; 348/117
(58) Field of Classification Search ................ None
See application file for complete search history.

(56) References Cited

U.S. PATENT DOCUMENTS

| | | | |
|---|---|---|---|
| 4,179,693 A * | 12/1979 | Evans et al. | 342/64 |
| 5,878,356 A * | 3/1999 | Garrot et al. | 701/1 |
| 6,928,194 B2 * | 8/2005 | Mai et al. | 382/284 |
| 7,127,348 B2 * | 10/2006 | Smitherman et al. | 701/208 |
| 7,191,056 B2 * | 3/2007 | Costello et al. | 701/200 |

OTHER PUBLICATIONS

D. Strelow and S. Singh, "Online Motion Estimation from Image and Inertial Measurements", Workshop on Integration of Vision and Inertial Sensors (INERVIS 2003), Coimbra, Portugal, Jun. 2003.
Dennis Strelow and Sanjiv Singh, "Reckless motion estimation from omnidirectional image and inertial measurements", IEEE Workshop on Omnidirectional Vision and Camera Networks (OMNIVIS 2003), Madison, WI, Jun. 2003.

* cited by examiner

*Primary Examiner*—Michael J. Zanelli
(74) *Attorney, Agent, or Firm*—Fogg & Powers LLC

(57) ABSTRACT

A method and system for navigation of an unmanned aerial vehicle (UAV) in an urban environment are provided. The method comprises capturing a first set of Global Positioning System (GPS)-tagged images in an initial fly-over of the urban environment at a first altitude, with each of the GPS-tagged images being related to respective GPS-aided positions. The captured GPS-tagged images are stitched together into an image mosaic using the GPS-aided positions. A second set of images is captured in a subsequent fly-over of the urban environment at a second altitude that is lower than the first altitude. Image features from the second set of images are matched with image features from the image mosaic during the subsequent fly-over. A current position of the UAV relative to the GPS-aided positions is calculated based on the matched image features from the second set of images and the image mosaic.

19 Claims, 3 Drawing Sheets

METHOD AND SYSTEM FOR NAVIGATION OF AN UMMANNED AERIAL VEHICLE IN AN URBAN ENVIRONMENT

The present application is related to U.S. patent application Ser. No. 11/470,152, which is incorporated herein by reference.

BACKGROUND

Unmanned aerial vehicles (UAVs) are remotely piloted or self-piloted aircraft that can carry sensors, communications equipment, or other payloads. They have been used in a reconnaissance and intelligence-gathering role for many years. More recently, UAVs have been developed for the purpose of surveillance and target tracking. Autonomous surveillance and target tracking performed by UAVs is either military or civilian environments is becoming an important aspect of intelligence-gathering methods.

Typically, UAVs use the Global Positioning System (GPS) to provide navigation over various terrains. In many scenarios, UAVs are required to fly in an urban environment, which often have an urban canyon effect. An "urban canyon" is an artifact of an urban environment similar to a natural canyon. The urban canyon is caused by streets cutting through dense blocks of high rise buildings such as skyscrapers. It is known that the urban canyon can cause problems in reception of GPS signals.

For example, GPS receivers can suffer from multipath errors which are caused from receiving a composite of direct GPS signals and reflected GPS signals from nearby objects such as buildings. In an urban canyon, a direct line of sight (LOS) GPS signal can be completely blocked by a building structure and a reflected signal can reach the receiver, resulting in position and velocity errors of significant magnitudes. Thus, when UAVs operate in an urban environment, access to the GPS signals needed to navigate without drift is often denied by the urban canyon.

Many methods have been proposed for using image-aided navigation of autonomous vehicles such as UAVs. For example, matching or referencing a GPS-denied vehicle's current image of terrain to a satellite image of the same terrain has been suggested. However, these methods lack the temporal and spatial proximity needed in order to use the images for UAV navigation in an urban canyon.

SUMMARY

The present invention is related to a method and system for navigation of an unmanned aerial vehicle (UAV) in an urban environment. The method and system comprise capturing a first set of Global Positioning System (GPS)-tagged images in an initial fly-over of the urban environment at a first altitude, with each of the GPS-tagged images being related to respective GPS-aided positions. The captured GPS-tagged images are stitched together into an image mosaic using the GPS-aided positions. A second set of images is captured in a subsequent fly-over of the urban environment at a second altitude that is lower than the first altitude. Image features from the second set of images are matched with image features from the image mosaic during the subsequent fly-over. A current position of the UAV relative to the GPS-aided positions is calculated based on the matched image features from the second set of images and the image mosaic.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the present invention. The following detailed description is, therefore, not to be taken in a limiting sense.

The present invention relates to a method and system for navigation of an unmanned aerial vehicle (UAV) in an urban environment. The present method and system are useful in GPS-denied navigation of a UAV. In general, the present method employs an initial UAV fly-over of an urban terrain at a higher altitude that will later be traversed at a lower altitude in the urban canyon. During the initial fly-over, GPS-tagged images are captured, and these images are stitched into a GPS-aided image mosaic. During the subsequent lower altitude flight in the urban canyon, images captured by the UAV camera can be matched to the fly-over image mosaic, and the current position of the UAV relative to GPS-aided positions used to acquire the fly-over image mosaic can be calculated. This results in a determination of the absolute position of the UAV at about the same accuracy as the GPS-aided positions originally used to construct the image mosaic.

Figure 1A:
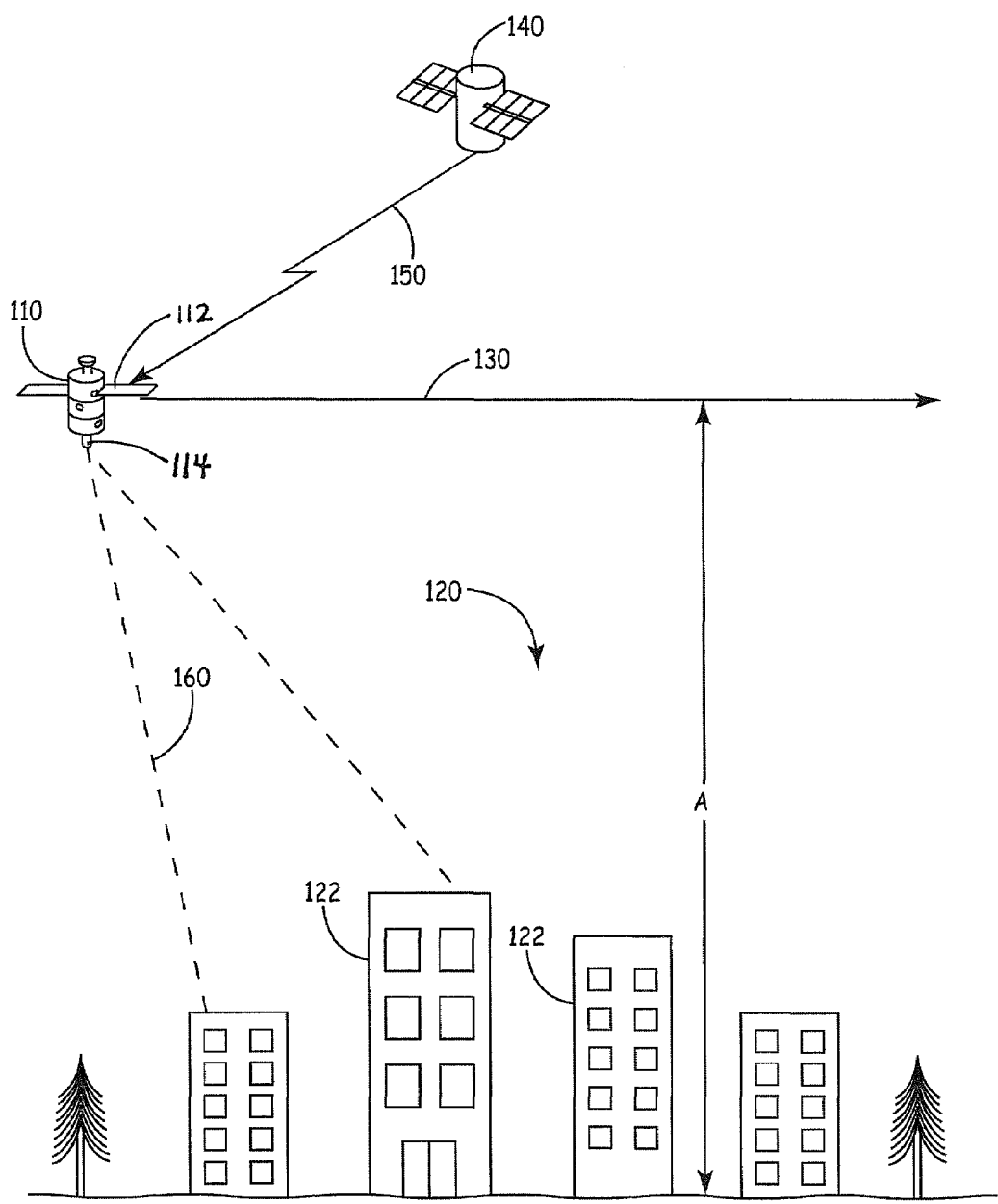
FIGS. 1A and 1B are schematic diagrams depicting a method for navigation of an unmanned aerial vehicle in an urban environment.
Figure 1B:
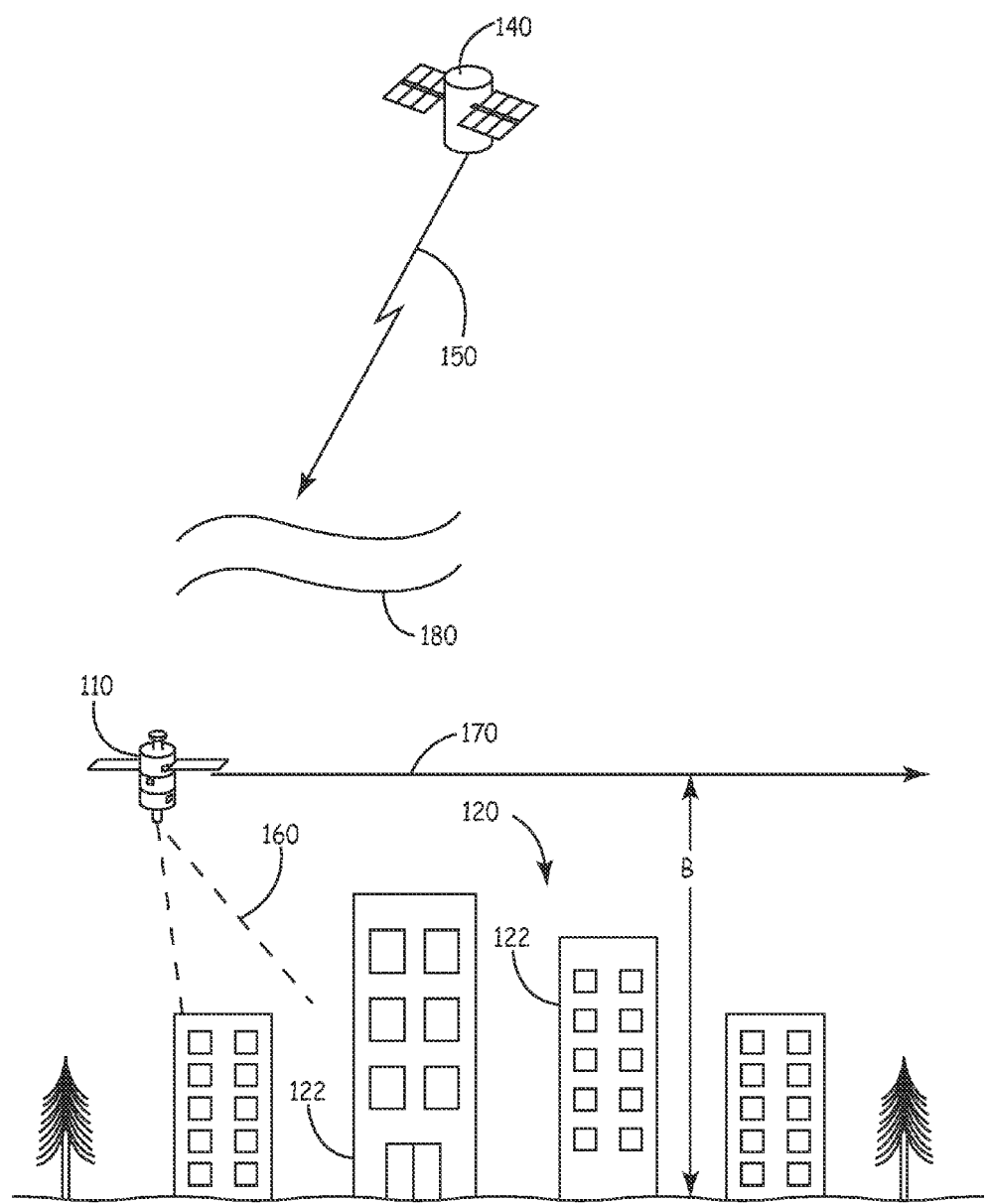

FIGS. 1A and 1B are schematic diagrams depicting the method for navigation of a UAV 110 in an urban environment 120 having various buildings 122. The UAV 110 can be a hover-capable aerial vehicle or a fixed-wing aerial vehicle. One or more image sensors such as a camera can be used by UAV 110, which provide a means for capturing images during flight. Additional sensors that can be used by the UAV include one or more GPS sensors for obtaining GPS measurements; inertial sensors such as accelerometers or gyroscopes; a radar sensor (e.g., Doppler radar for velocity measurements); and laser detection and ranging (LADAR) or acoustic sensors (for distance measurements). Various combinations of any of the above sensors may also be employed in the UAV.

As shown in FIG. 1A, UAV 110 travels along a first path 130 in an initial fly-over of urban environment 120 at a first altitude A. A GPS satellite 140 transmits GPS signals 150 to a GPS sensor 112 such as a receiver carried onboard UAV 110. An image sensor 114 such as a camera captures a first set of GPS-tagged images during the initial fly-over, with each of the GPS-tagged images being related to respective GPS-aided positions. Each of the images is captured within a field-of-view (FOY) 160 of the camera. The captured GPS-tagged images are then stitched together into an image mosaic using the GPS-aided positions.

As illustrated in FIG. 1B, UAV 110 makes a subsequent fly-over of urban environment 120 along a second path 170 at a second altitude B that is lower than the first altitude A. A second set of images is captured by the camera within FOV 160 during the subsequent fly-over. Image features in the second set of images are matched with image features from the image mosaic during the subsequent fly-over. A current position of UAV 110 relative to the GPS-aided positions is calculated based on the matched image features from the second set of images and the image mosaic. This aids in the navigation of UAV 110 flying at the lower altitude, since urban environment 120 can interfere with GPS signals 150 because of an urban canyon effect 180.

The present navigation approach differs from referencing to a satellite image in that the UAV acquires its own reference imagery during a preliminary flight. An advantage of the present approach is the temporal and spatial proximity of the acquired fly-over image mosaic to the images the UAV will later capture while navigating in the urban environment.

Figure 2:
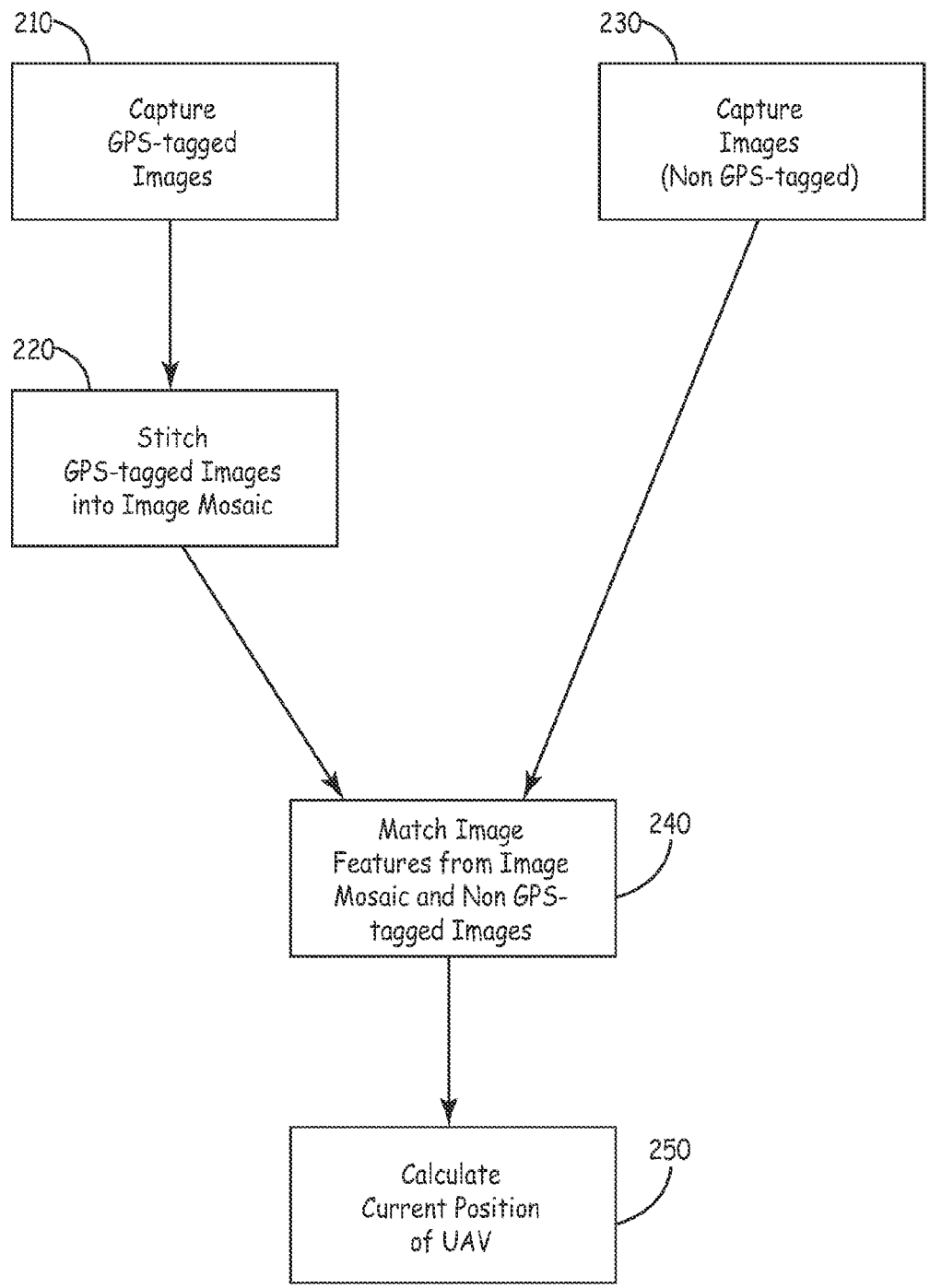
FIG. 2 is a processing flow diagram of a method for navigation of an unmanned aerial vehicle in an urban environment.

FIG. 2 is a processing flow diagram of the method for navigation of a UAV in an urban environment. As discussed above, a first set of GPS-tagged images are captured during the initial fly-over of the urban environment at a first altitude (block 210), with each of the GPS-tagged images being related to respective GPS-aided positions. The captured GPS-tagged images are then stitched together into an image mosaic (block 220) using the GPS-aided positions.

A second set of images is captured (block 230) in a subsequent fly-over of the urban environment at a second altitude that is lower than the first altitude. The second set of images are non-GPS-tagged images. During the subsequent fly-over, image features from the image mosaic are matched with image features in the non-GPS-tagged images (block 240). A current position of the UAV relative to the GPS-aided positions is then calculated (block 250) based on the matched image features.

The present method automatically establishes the correspondences between the images in the fly-over image mosaic and the current images (non-GPS-tagged) of the UAV. This automatic procedure overcomes differences in lighting, view angle, the scene (e.g., cars parked or moved), and particularly scale between the mosaic images and the current images of the UAV. This can be accomplished by combining (1) an inertial position estimate of the UAV to get a prior distribution and initial estimate for possible matches between the mosaic images and the current images, and (2) cueing based on salient image features to "spontaneously" notice matches between the mosaic images and the current images. A variety of salient image feature types can be considered depending on the exact scenario.

The present method can be implemented by utilizing computer hardware and/or software, which provide a means for stitching the captured GPS-tagged images together into an image mosaic using the GPS-aided positions, a means for matching image features from the second set of images with image features from the image mosaic, and a means for calculating a current position of the unmanned aerial vehicle relative to the GPS-aided positions based on the matched image features.

Instructions for carrying out the various process tasks, calculations, control functions, and the generation of signals and other data used in the operation of the method and systems described herein can be implemented in software, firmware, or other computer readable instructions. These instructions are typically stored on any appropriate computer readable media used for storage of computer readable instructions or data structures. Such computer readable media can be any available media that can be accessed by a general purpose or special purpose computer or processor, or any programmable logic device.

Suitable computer readable media may comprise, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media. Any of the foregoing may be supplemented by, or incorporated in, specially-designed application-specific integrated circuits (ASICs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

The method of the invention can be implemented in computer readable instructions, such as program modules or applications, which are executed by a data processor. Generally, program modules or applications include routines, programs, objects, data components, data structures, algorithms, etc. that perform particular tasks or implement particular abstract data types. These represent examples of program code means for executing steps of the method disclosed herein. The particular sequence of such executable instructions or associated data structures represents examples of corresponding acts for implementing the functions described in such steps.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for navigation of an unmanned aerial vehicle in an urban environment, the method comprising:
    capturing a first set of Global Positioning System (GPS)-tagged images in an initial fly-over of the urban environment at a first altitude, with each of the GPS-tagged images being related to respective GPS-aided positions;
    stitching the captured GPS-tagged images together into an image mosaic using the GPS-aided positions;
    capturing a second set of images in a subsequent fly-over of the urban environment at a second altitude that is lower than the first altitude;
    matching image features from the second set of images with image features from the image mosaic during the subsequent fly-over; and
    calculating a current position of the unmanned aerial vehicle relative to the GPS-aided positions based on the matched image features from the second set of images and the image mosaic.

2. The method of claim 1, wherein the first and second set of images are captured by one or more cameras on the unmanned aerial vehicle.

3. The method of claim 1, wherein the GPS-aided positions are based on input from one or more GPS sensors on the unmanned aerial vehicle.

4. The method of claim 1, wherein the image features from the second set of images are matched with image features from the image mosaic by a method comprising:

estimating an inertial position of the unmanned aerial vehicle to obtain a prior distribution and initial estimate for possible matches between the image features; and cueing based on salient image features to detect matches between the second set of images and the image mosaic.

5. The method of claim 4, wherein the inertial position is estimated based on input from one or more inertial sensors on the unmanned aerial vehicle.

6. The method of claim 5, wherein the inertial sensors comprise one or more gyroscopes, accelerometers, or combinations thereof.

7. The method of claim 1, wherein the unmanned aerial vehicle comprises a hover-capable aerial vehicle.

8. The method of claim 1, wherein the unmanned aerial vehicle comprises a fixed-wing aerial vehicle.

9. The method of claim 1, wherein the urban environment has an urban canyon.

10. The method of claim 1, wherein the second set of images are non-GPS-tagged images.

11. A system for navigation of an unmanned aerial vehicle in an urban environment, the system comprising:

one or more Global Positioning System (GPS) sensors;

one or more image sensors configured to capture a first set of GPS-tagged images and a second set of images during fly-overs of the urban environment; and a processor operatively coupled to the one or more image sensors and configured to execute program instructions for a process comprising:

stitching the captured GPS-tagged images together into an image mosaic using GPS-aided positions obtained during an initial fly-over of the urban environment at a first altitude;

matching image features from the second set of images with image features from the image mosaic, the second set of images obtained during a subsequent fly-over of the urban environment at a second altitude that is lower than the first altitude; and calculating a current position of the unmanned aerial vehicle relative to the GPS-aided positions based on the matched image features from the second set of images and the image mosaic.

12. The system of claim 11, wherein the image sensors comprise one or more cameras on the unmanned aerial vehicle.

13. The system of claim 11, further comprising one or more inertial sensors on the unmanned aerial vehicle.

14. The system of claim 13, wherein the inertial sensors comprise one or more gyroscopes, accelerometers, or combinations thereof.

15. The system of claim 11, wherein the unmanned aerial vehicle comprises a hover-capable aerial vehicle.

16. The system of claim 11, wherein the unmanned aerial vehicle comprises a fixed-wing aerial vehicle.

17. A non-transitory computer readable medium having instructions stored thereon for a method for navigation of an unmanned aerial vehicle in an urban environment, the method comprising:

capturing a first set of Global Positioning System (GPS)-tagged images in an initial fly-over of the urban environment at a first altitude, with each of the GPS-tagged images being related to respective GPS-aided positions;

stitching the captured GPS-tagged images together into an image mosaic using the GPS-aided positions;

capturing a second set of images in a subsequent fly-over of the urban environment at a second altitude that is lower than the first altitude;

matching image features from the second set of images with image features from the image mosaic during the subsequent fly-over; and calculating a current position of the unmanned aerial vehicle relative to the GPS-aided positions based on the matched image features from the second set of images and the image mosaic.

18. The non-transitory computer readable medium of claim 17, wherein the image features from the second set of images are matched with image features from the image mosaic by a method comprising:

estimating an inertial position of the unmanned aerial vehicle to obtain a prior distribution and initial estimate for possible matches between the image features; and cueing based on salient image features to detect matches between the second set of images and the image mosaic.

19. The non-transitory computer readable medium of claim 17, wherein the second set of images are non-GPS-tagged images.

* * * * *